United States Patent
Homma et al.

(10) Patent No.: US 7,321,815 B2
(45) Date of Patent: Jan. 22, 2008

(54) VEHICLE-MOUNTED EQUIPMENT CONTROL APPARATUS

(75) Inventors: Yasuhide Homma, Saitama-ken (JP); Yoichi Hara, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 356 days.

(21) Appl. No.: 11/089,046

(22) Filed: Mar. 25, 2005

(65) Prior Publication Data

US 2005/0222725 A1 Oct. 6, 2005

(30) Foreign Application Priority Data

Mar. 26, 2004 (JP) ............................. 2004-093135

(51) Int. Cl.
G06F 7/00 (2006.01)
B60L 1/00 (2006.01)
(52) U.S. Cl. ......................................... 701/36; 307/9.1
(58) Field of Classification Search .................... 701/1, 701/36, 29; 307/9.1, 10.1
See application file for complete search history.

(56) References Cited

U.S. PATENT DOCUMENTS 5,590,040 A * 12/1996 Abe et al. ...................... 701/35
5,764,139 A * 6/1998 Nojima et al. ............... 340/461

FOREIGN PATENT DOCUMENTS

JP 2000-172195 A 6/2000

* cited by examiner

*Primary Examiner*—Yonel Beaulieu
(74) *Attorney, Agent, or Firm*—Arent Fox LLP

(57) ABSTRACT

A vehicle-mounted equipment control system having a power state detecting unit for detecting whether a power of vehicle-mounted equipment is ON or OFF, a vehicle state detecting unit for detecting whether a vehicle is running or at a standstill, a counting unit for performing a counting operation when the power state detecting unit detects a change of power from OFF to ON, and for performing a resetting operation when the vehicle state detecting unit detects a change of vehicle state from a running state to standstill state, and a control unit for regulating or deregulating the image display or the operation of the vehicle-mounted equipment based on a detected result of the vehicle state detecting unit and a counted value of the counting unit.

13 Claims, 8 Drawing Sheets

|  | MUM=0 | MUM=1 | MUM=2 | MUM=3 |
|---|---|---|---|---|
| S2 (RUNNING STATE) | <PROCESS 1> REGULATION OF DISPLAY | <PROCESS 1> REGULATION OF DISPLAY | <PROCESS 1> REGULATION OF DISPLAY | <PROCESS 3> REGULATION OF DISPLAY/WARNING |
| S2 (STANDSTILL STATE) | <PROCESS 2> DEREGULATION OF DISPLAY | <PROCESS 2> DEREGULATION OF DISPLAY | <PROCESS 2> DEREGULATION OF DISPLAY | <PROCESS 4> REGULATION OF DISPLAY/WARNING |

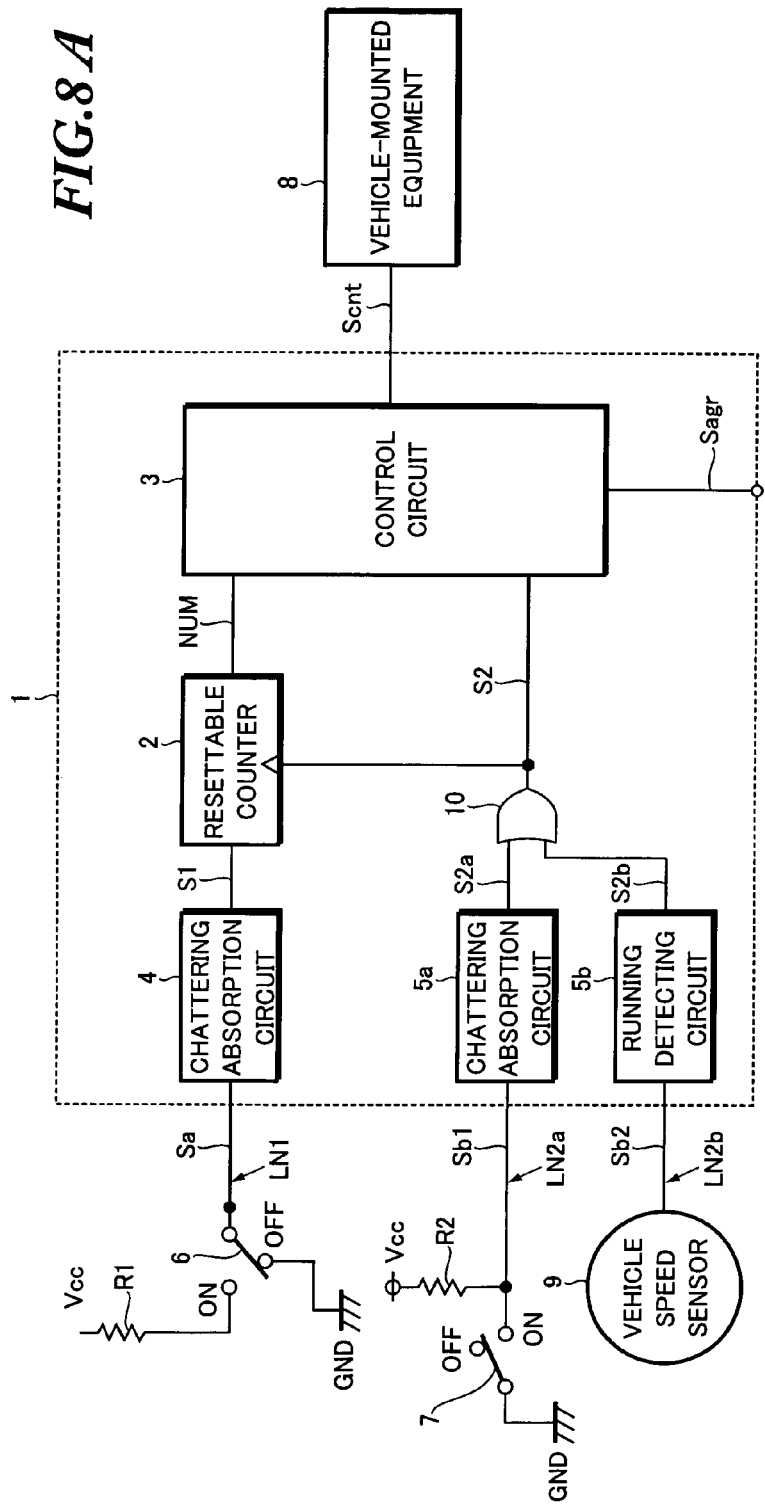

VEHICLE-MOUNTED EQUIPMENT CONTROL APPARATUS

BACKGROUND OF THE INVENTION

The present invention relates to a vehicle-mounted equipment control apparatus, a control method, a program thereof, and a recording medium thereof, for controlling a display of image or an operation of the equipment when a vehicle is running.

The present application claims priority from Japanese Patent Application No. 2004-093135, the disclosure of which is incorporated herein by reference.

A vehicle-mounted equipment, having an image display unit and an operation unit, such as a television set or a navigation device mounted on a vehicle is provided with a control apparatus which regulates an image display or a part of operation of the equipment when a vehicle is running in order to ensure a safe driving. In other words, the image display and the operation of the television set or the operation of the navigation device are enabled only when the vehicle is at a standstill.

In conventional control apparatuses for vehicle-mounted equipments, there is a type of control apparatus which detects whether a vehicle is running or at a standstill through detecting only an ON/OFF state of a parking brake (so-called "side brake").

In this type of apparatus, when a detection line for detecting the ON/OFF state of the parking brake is connected to a vehicle body ground by a remodeling of vehicle, it is determined that the vehicle is always at a standstill, i.e., as parking-brake ON even if the vehicle is running. In other words, there occurs any problem that in spite of under the state of driving the vehicle the television picture is displayed, and the regulation of operation is removed.

Then, in order to resolve the above problems, the Japanese Patent Application Laid-open No. 2000-172195 discloses the following control apparatus for a vehicle-mounted image display system.

The vehicle-mounted image display system is first activated when an accessory power switch (ACC switch) of a vehicle is turned ON, and then operations in steps 104-113 as shown in FIG. 2 of the above publication, i.e., the determination as to whether the respective ON/OFF operations of parking brake and foot brake is continued in predetermined sequence, are carried out when the vehicle is at a standstill. In other words, when the detection line is determined to be not connected with the vehicle body ground, but adequately connected, based on a result of the above determination, the image display is allowed or the regulation of operation is removed at steps S114, S115.

More specifically, after the determination that the detection line is adequately connected was made, the display of television picture or the operation of equipments are enabled under the determination that the vehicle is at a standstill when the parking brake is under the ON state at step S117, while the display of picture or the operation of equipments are regulated under the determination that the vehicle is running when the parking brake is under the OFF state at step S118.

Moreover, the vehicle-mounted image display system as disclosed in the above publication requests users such as drivers to perform the respective ON/OFF operations of parking brake and foot brake in the predetermined sequence to confirm whether the detection line of the parking brake is adequately connected, in order to prevent the regulation of television picture display or operation from being removed during the running state of vehicle. That is, it is a countermeasure against the case that the detection line for detecting any state of vehicle where the vehicle is running or at a standstill is illegally remodeled. After confirming that the detection line is adequately connected, the control apparatus detects whether the vehicle is running or at a standstill based on detection signals on the detection lines. As a result, a regulation of display or a release of the regulation is performed in accordance with the running or at a standstill state.

In this conventional image display system mounted on the vehicle, there is a problem of bothersome operation since a user have to make the ON/OFF operation of the parking brake and the foot brake in the predetermined sequence always when the vehicle-mounted image display system is activated for displaying the image after an accessory power switch is turned ON.

In addition, the user has to release the parking brake (Power-OFF operation) once even when the vehicle is at a standstill in order to view the image display of the vehicle-mounted image display system. The release of the parking brake during the vehicle's stop may reduce safety of the vehicle.

Further, since there is a necessity of providing the detection line for detecting the ON/OFF state of the foot brake in this conventional apparatus, any additional cost for manufacturing and mounting the detection line occurs.

SUMMARY OF THE INVENTION

In order to cope with the above conventional problems, the object of the present invention is to provide a vehicle-mounted equipment control apparatus which can give a user better operability thereof.

Additionally, the present invention has an another object of providing a vehicle-mounted equipment control apparatus which can detect a case that a vehicle-mounted equipment was mounted on the vehicle inadequately, due to an unapt connection of the detection line for detecting whether the vehicle is running or at a standstill.

The present invention has a further object of preventing the vehicle from being remodeled to inadequately connect the detection line so as to control the vehicle-mounted equipments.

According to a first aspect of the present invention, a vehicle-mounted equipment control system for regulating an image display or an operation by a vehicle-mounted equipment during vehicle's running comprises power state detecting means for detecting whether a power of the vehicle-mounted equipment is ON or OFF, and vehicle state detecting means for detecting whether a vehicle is running or at a standstill. The control system further comprises counting means for performing a counting operation when the power state detecting means detects a change of power from OFF to ON, and for performing a resetting operation when the vehicle state detecting means detects a change of vehicle state from a running state to standstill state, and control means for regulating or deregulating an image display or an operation of the vehicle-mounted equipment based on a detected result of the vehicle state detecting means and a counted or reset value of the counting means.

According to a second aspect of the present invention, a vehicle-mounted equipment control method for regulating an image display or an operation by a vehicle-mounted equipment during vehicle's running comprises the steps of detecting a power state to detect whether a power of the vehicle-mounted equipment is ON or OFF, and detecting a vehicle state to detect whether a vehicle is running or at a standstill. The control method further comprises the steps of performing a counting operation when the power state detecting step detects a change of power from OFF to ON, and also a resetting operation when the vehicle state detecting step detects a change of vehicle state from a running state to standstill state, and then controlling a regulation or a deregulation of image display or operation of the vehicle-mounted equipment based on a detected result of the vehicle state detecting step and a counted or reset value of the counting step.

According to a third aspect of the present invention, a program for enabling a computer to regulate an image display or an operation by a vehicle-mounted equipment during vehicle's running comprises the steps of detecting a power state for enabling the computer to detect whether a power of the vehicle-mounted equipment is ON or OFF, and detecting a vehicle state for enabling the computer to detect whether a vehicle is running or at a standstill. The computer program further comprises the steps of performing a counting operation when the power state detecting step detects a change of power from OFF to ON, and also a resetting operation when the vehicle state detecting step detects a change of vehicle state from a running state to standstill state, and then controlling a regulation or a deregulation of image display or operation of the vehicle-mounted equipment based on a detected result of the vehicle state detecting step and a counted or reset value of the counting step.

According to a fourth aspect of the present invention, a recording medium for recording the program according to the third aspect of the present invention is provided.

BRIEF DESCRIPTION OF THE DRAWINGS

These and other objects and advantages of the present invention will become clear from the following description with reference to the accompanying drawings, wherein:

FIGS. 8A and 8B are block diagrams showing each configuration of vehicle-mounted equipment control apparatuses according to modified examples of the present invention.

DETAILED DESCRIPTION OF THE PREFERRED EMBODIMENTS

The preferred embodiment of the present invention will be described with reference to FIGS. 1A and 1B.

Figures 1A, 1B:
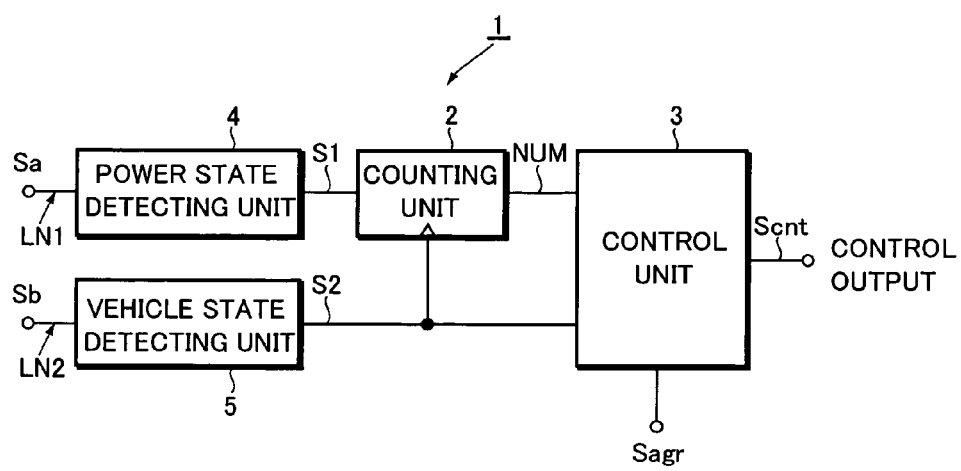
FIGS. 1A and 1B are diagrams for explaining a configuration and a function of a vehicle-mounted equipment control apparatus according to the present invention, respectively.

FIG. 1A is a block diagram showing a configuration of a vehicle-mounted equipment control apparatus according to the present embodiment. FIG. 1B is a diagram for explaining functions of the vehicle-mounted equipment control apparatus.

The vehicle-mounted equipment control apparatus 1 is provided with a counting unit 2, a control unit 3, a power state detecting unit 4, and a vehicle state detecting unit 5 as shown in FIG. 1A.

The power state detecting unit 4 detects whether a vehicle-mounted equipment, which is a control target of the vehicle-mounted equipment control apparatus 1, is turned on power, i.e., being the power-ON state, or cut power off, being the power-OFF state. As a result of the detection, the power state detecting unit 4 outputs a power state detecting signal S1 to the counting unit 2.

For example, the power state detecting unit 4 is connected to an accessory power switch (ACC switch) arranged in a vehicle through a detection line LN1. The power state detecting unit 4 detects the power-ON state and the power-OFF state of the ACC switch, based on ON/OFF signals Sa formed on the detection line LN1, thereby detecting the power-ON/OFF states of the vehicle-mounted equipment, which is supplied power from a vehicle-mounted battery through the ACC switch.

The vehicle state detecting unit 5 detects whether the vehicle is in the state of running or at a standstill, and outputs a vehicle state detecting signal S2 to the counting unit 2 and the control unit 3 as a result of the detection.

For example, the vehicle state detecting unit 5 is connected to a parking brake, a vehicle speed sensor, or the like, arranged in the vehicle, through a detection line LN2. The vehicle state detecting unit 5 detects the ON/OFF operations of the parking brake, based on ON/OFF signals Sb formed on the detection line LN2, thereby detecting whether the vehicle is in the state of running or at a standstill. It also detects whether the vehicle is on the state of running or at a standstill, based on a vehicle speed pulse Sb formed on the detection line LN2 from the vehicle speed sensor.

The counting unit 2 is formed with a resettable counter or the like, which performs the counting operation in accordance with the power state detecting signals S1, and the resetting operation in accordance with the vehicle state detecting signal S2 to output a counted value NUM to the control unit.

The counting unit 2 may be a resettable counter, which counts up, or counts down by one in the counting operation. The resettable counter may not be limited only to counting up or down by one, but to counting by the prescribed numbers at a time.

The counting unit 2 performs the counting operation in synchronization with the change of the power state detecting signal S1, which occurs when the vehicle-mounted equipment shifts from the power-OFF state to the power-ON state, and the resetting operation in synchronization with the change of the vehicle state detecting signal S2, which occurs when the vehicle is shifted from the state of running to standstill. Subsequently, the counting unit 2 outputs the counted value NUM, based on a result of the counting and the resetting operation.

Therefore, the counting unit 2 varies the counted value NUM by counting how many times the power state detecting signal S1 changes as long as the power state detecting signal S1 changes and the vehicle state detecting signal S2 does not change. The counting unit 2 also initializes the counted value NUM to the number such as "0" by the resetting operation when the vehicle state detecting signal S2 changes.

The control unit 3 is formed with a circuit having calculation functions such as micro processing unit (MPU), digital signal processor (DSP) or logical operation circuits, outputting a control signal Scnt for controlling the image display and the operation of the vehicle-mounted equipment, based on the counted value NUM and the vehicle state detecting signal S2.

More specifically, the control unit 3 compares a threshold value K determined beforehand for detecting abnormality and the counted value NUM one by one, and then analyzes the comparison result and the vehicle state detecting signal S2 entirely in accordance with the below-mentioned "Process 1" "Process 2" "Process 3" and "Process 4". Thereby, as shown in FIG. 1B, the control unit 3 controls the vehicle-mounted equipment by outputting the control signal Scnt showing the result from a judgment which indicates either regulating or deregulating the image display and the operation of the vehicle-mounted equipment.

Meanwhile, the threshold value K is set to be more than 2, that is, the counted value NUM as counted at least twice after the counting unit 2 performs the resetting operataion.

FIG. 1B shows an example where the counting unit 2 is formed with the resettable counter which counts up by one at a time, and the threshold value K is set to be 3, in which the term, "regulation of display" is defined as regulating the image display and the operation of the vehicle-mounted equipment, and also the term, "deregulation of display" is defined as removing the regulation of the image display and the operation of the vehicle-mounted equipment.

"Process 1"

When the counted value NUM is less than the threshold value K in number, and the vehicle state detecting signal S2 shows that the vehicle is running, the control unit 3 judges that the vehicle is in the state of running, thereby outputs the control signal Scnt indicating the regulation of the display to regulate the display of the vehicle-mounted equipment.

Therefore, in FIG. 1B, if the counted value NUM is less than the threshold value K, i.e., 3 in number, and the vehicle state detecting signal S2 shows that the vehicle is running, the control unit 3 makes the vehicle-mounted equipment regulate the display.

"Process 2"

When the counted value NUM is less than the threshold value K, and the vehicle state detecting signal S2 shows that the vehicle is at a standstill, the control unit 3 judges that the vehicle is certainly at a standstill, thereby outputs the control signal Scnt indicating the deregulation of the display, and deregulates the display for the vehicle-mounted equipment which is placed restriction on the display. Also, the control unit 3 makes the vehicle-mounted equipment displaying the image continue the image display.

Therefore, in FIG. 1B, when the counted value NUM is less than the threshold value K, i.e., 3 in number, and the vehicle state detecting signal S2 shows that the vehicle is at a standstill, the control unit 3 makes the vehicle-mounted equipment deregulate the display, and the vehicle-mounted equipment displaying the image continue the image display.

"Process 3"

When the counted value NUM is greater than or equal to the threshold value K in number, and the vehicle state detecting signal S2 shows that the vehicle is running, the control unit 3 judges that the vehicle is in the state of running, thereby outputs the control signal Scnt indicating that the display should be regulated. Furthermore, the control unit 3 determines that any abnormality occurs, for example, the detection line LN2 is not appropriately connected, and outputs the control signal Scnt to give a user warning together with the regulation of the display.

Hence, in FIG. 1B, if the counted value NUM reaches to the threshold value K, i.e., 3 in number, and the vehicle state detecting signal S2 shows that the vehicle is in the state of running, the control unit 3 makes the vehicle-mounted equipment give the user warning besides the regulation of the display.

The user takes a measure such as mounting the vehicle-mounted equipment appropriately on the vehicle for the warning to remove the source of the problem. Furthermore, the prescribed operation for inputting is performed so that the prescribed input signal Sagr is input to deregulate the display and stop the warning, and then an analysis operation based on "Process 1" to "Process 4" is started.

"Process 4"

When the counted value NUM is greater than or equal to the threshold value K, and the vehicle state detecting signal S2 shows that the vehicle is at a standstill, the control unit 3 judges that any abnormality occurs, for example, the detection line LN2 is not appropriately connected, so that the control signal Scnt indicating the regulation of the display is output. In addition, the control unit 3 outputs the control signal Scnt to give a warning besides regulating the display.

Therefore, in FIG. 1B, if the counted value NUM reached the threshold value K, i.e., 3 in number, and the vehicle state detecting signal S2 shows that the vehicle is at a standstill, the control unit 3 makes the vehicle-mounted equipment give the user a warning besides regulating the display.

The user takes a measure such as mounting the vehicle-mounted equipment appropriately on the vehicle for the warning to remove the source of the problem. Furthermore, the prescribed operation for inputting is performed so that the prescribed input signal Sagr is input to deregulate the display and stop the warning, and then an analysis operation based on "Process 1" to "Process 4" is started.

The following is a description about the operation of the vehicle-mounted equipment control apparatus 1 having the above-mentioned configuration according to the present invention.

In case that the vehicle-mounted equipment is appropriately mounted on the vehicle without any remodeling, the power state detecting signal S1 changes in accordance with the ON/OFF operation of the ACC switch, and also the vehicle state detecting signal S2 being output from the vehicle detecting unit 5 changes based on the states of the vehicle, which is either running or at a standstill.

For this reason, while the counting unit 2 counts up a value thereof according to the changes of the power state detecting signal S1, the value is reset in accordance with the changes of the vehicle state detecting signal S2 caused when the vehicle shifts from the state of running to standstill. In other words, the counting unit 2 initializes the counted value NUM before it reaches to the threshold value K.

As the example is showed in FIG. 1B, the counted value NUM is set to "0", when the vehicle actually shifts from the state of running to standstill.

Therefore, when the user turns on the ACC switch to drive the vehicle, the control unit 3 regulates the display of the vehicle-mounted equipment by performing the above-mentioned "Process 1". When the user stops the vehicle, the control unit 3 deregulates the display of the vehicle-mounted equipment by performing the above-mentioned "Process 2", thereby, enabling the user to display the image on the vehicle-mounted equipment or operate it.

On the other hand, in case that the vehicle-mounted equipment is not appropriately mounted on the vehicle due to any remodeling, the vehicle state detecting signal S2 does not suitably change in accordance with the states of the vehicle, i.e., either running or standstill.

The counting unit 2 performs the resetting operation at the time of the change of the vehicle state detecting signal S2, that is, when the vehicle shifts from the state of running to standstill. Therefore, if any abnormal vehicle state detecting signal S2, which does not change according to the state of the vehicle, which is either running or at a standstill, is supplied, the counting unit 3 does not perform the resetting operation. The counting unit 3 performs the counting operation in accordance with the change of the power state detecting signal S1 every time the user switches the vehicle-mounted equipment from the power-OFF state to the power-ON state. As a result, the counted value NUM gradually comes close to the threshold value K, and finally reaches the threshold value K.

As exemplified in FIG. 1B, when the counted value NUM reaches the threshold value K, the control unit 3 detects the occurrence of abnormality to perform the above-mentioned "Process 3" and "Process 4". More specifically, the control unit 3 notifies the occurrence of the abnormality to the user to urge the user to take measures for improvement, such as mounting the vehicle-mounted equipment appropriately on the vehicle, by continuing the regulation of the display and the warning.

As explained above, if the vehicle-mounted equipment is properly mounted on the vehicle without any remodeling, the vehicle-mounted equipment control apparatus 1 according to the present embodiment regulates the image display only when the vehicle is running, and deregulates the display when the vehicle is at a standstill. Therefore, the vehicle-mounted equipment control apparatus 1 can perform a so-called "interlock control", which quickly responds to the state of the vehicle, i.e., either running or standstill, and then ensure the user's safety while driving a car.

If the vehicle-mounted equipment is mounted properly on the vehicle without any remodeling, the user can make the vehicle-mounted equipment display the image and operate it by shifting the power-OFF state to the power-ON state while the vehicle is at a standstill. In doing so, the user need not perform the operation for releasing the parking brake once, as requested in the conventional art. According to the present invention, the display on the equipment is deregulated automatically. In other words, the user can make the vehicle-mounted equipment display the image thereon and operate it only by stopping the vehicle, that is, the user's other action is not necessary, thereby a good operability of the control apparatus can be provided and the safety of the vehicle be ensured.

As the detection lines need not particularly be constructed, the vehicle-mounted equipment control apparatus can be provided with satisfaction in terms of operability, easiness of mounting, and cost, or the like, of the vehicle-mounted equipment.

If the vehicle-mounted equipment is not appropriately mounted on the vehicle due to any remodeling, the counting unit 2 does not perform the resetting operation, but perform the counting operation in accordance with the change of the power state detecting signal S1 every time the user shifts the vehicle-mounted equipment from the power-OFF state to the power-ON state when driving the vehicle. As a result, the counted value reaches the threshold value K, which is detected by the control unit 3, and consequently the image display on the equipment is regulated. Therefore, the vehicle-mounted equipment control apparatus 1 according to the present embodiment does not overlook unusual situations, for example, the vehicle-mounted equipment is not properly mounted on the vehicle, enabling to make the so-called interlock control for regulating the image display in order to ensure the safety while driving a car.

Furthermore, as the control unit 3 gives a warning in addition to regulating the display in the above-mentioned "Process 3" and "Process 4", the occurrence of abnormality is advised to the user to urge him or her to take measures for improvement. If the user does not take action appropriately for the warning, the regulation of display is not removed and the warning is further continued. Thus, illegal actions such as wiring and connecting the detection line improperly by remodeling, can be prevented, and the user is urged to arrange the vehicle-mounted equipment properly in the vehicle.

While the vehicle-mounted equipment control apparatus 1 is constructed from so-called "hardware" in the descriptions according to the present embodiment above described, the functions of the counting unit 2, the control unit 3, the power state detecting unit 4 and the vehicle state detecting unit 5 may be put into practice by a computer program, then the computer program may be accomplished by a microprocessor.

Embodiment 1

Next, the first embodiment will be more specifically explained with reference to FIG. 2 to FIG. 6.

Figure 2:
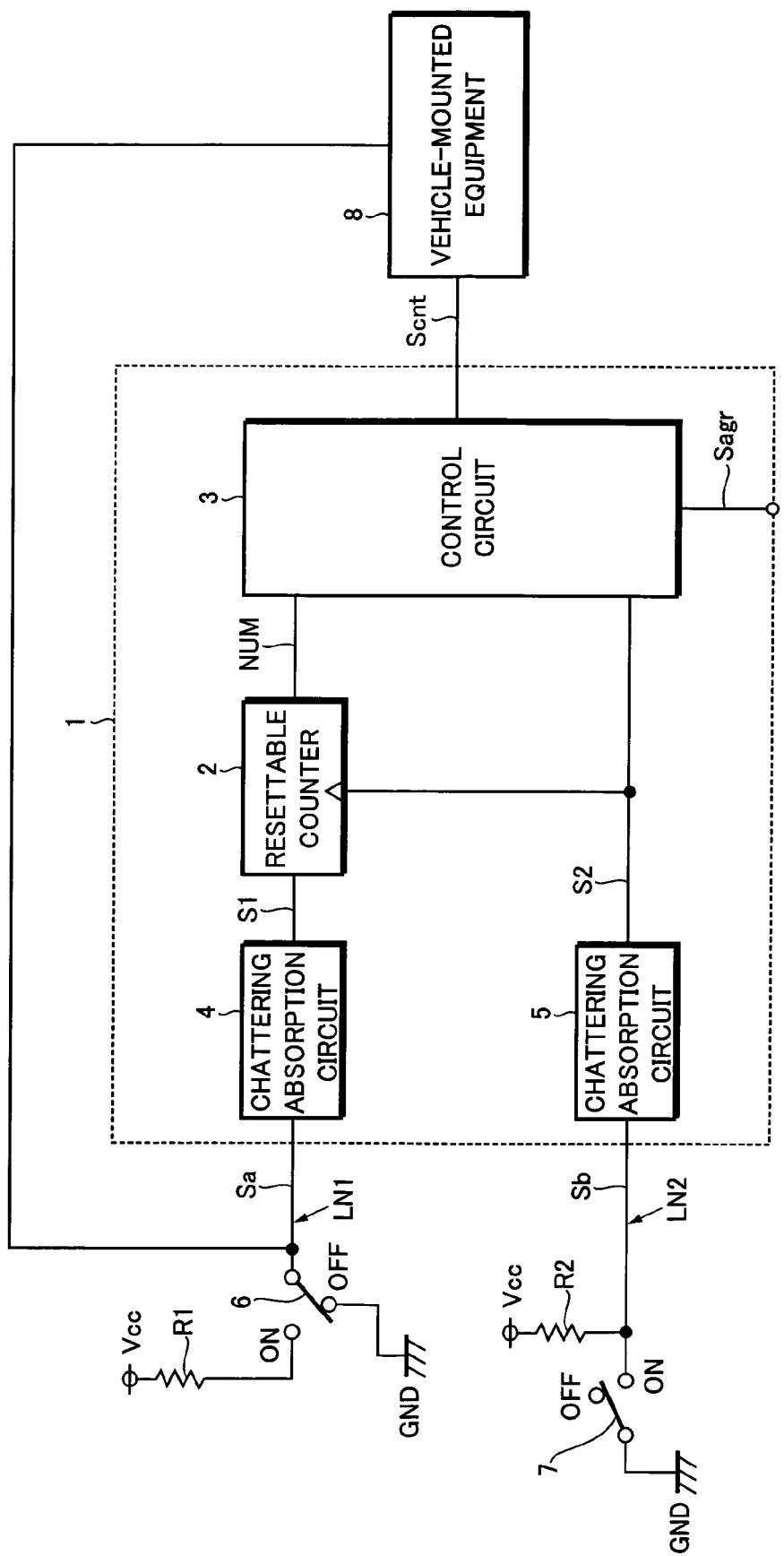
FIG. 2 is a block diagram showing a configuration of a vehicle-mounted equipment control apparatus according to the first embodiment of the present invention.

FIG. 2 is a block diagram showing a configuration of the vehicle-mounted equipment control apparatus according to the present embodiment, in which the same or corresponding parts as those in FIG. 1a are indicated with the same numerals or symbols.

Figure 3:
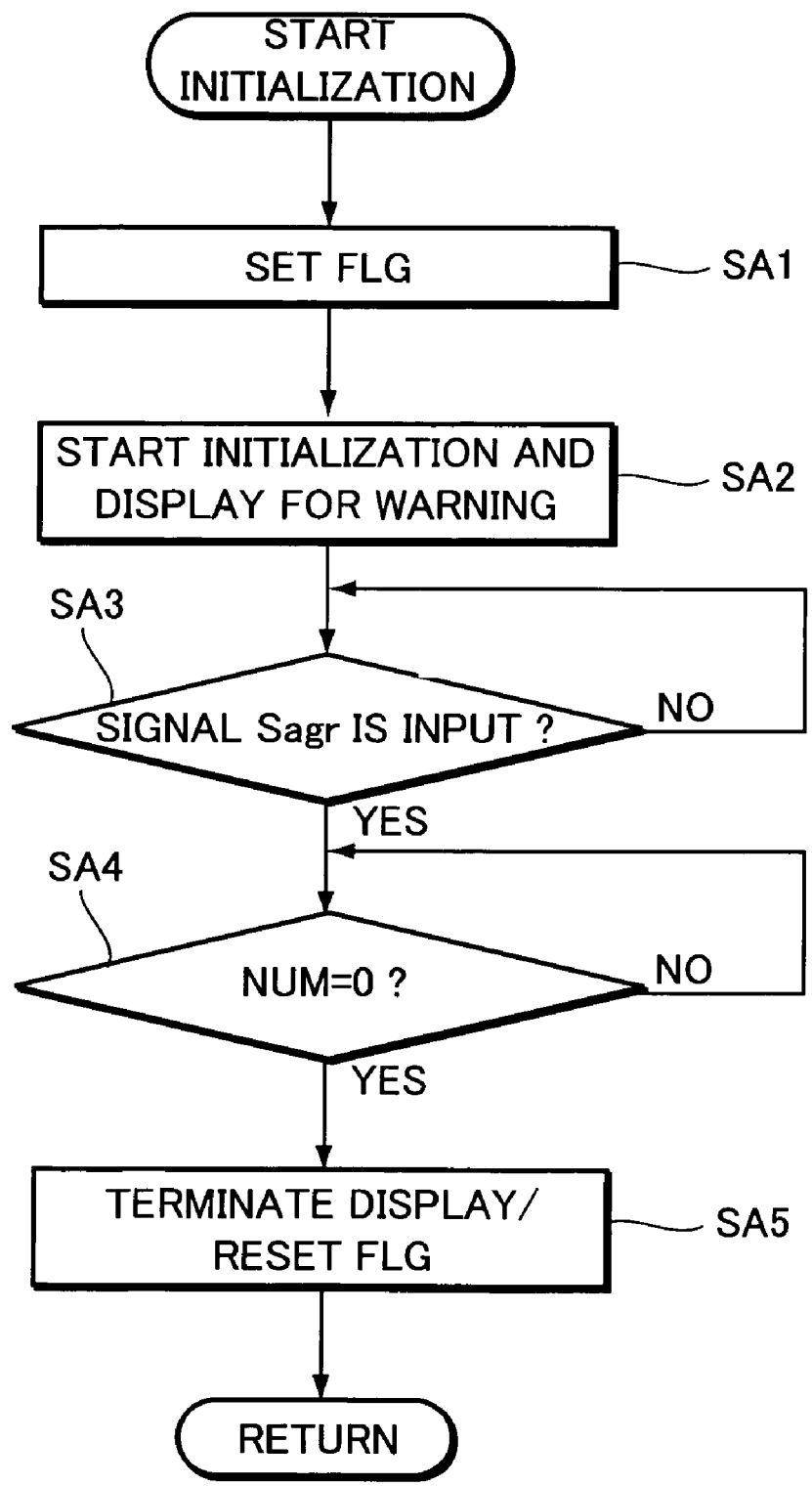
FIG. 3 is a flowchart for explaining an operation of the vehicle-mounted equipment control apparatus as shown in FIG. 1A.
Figure 4:
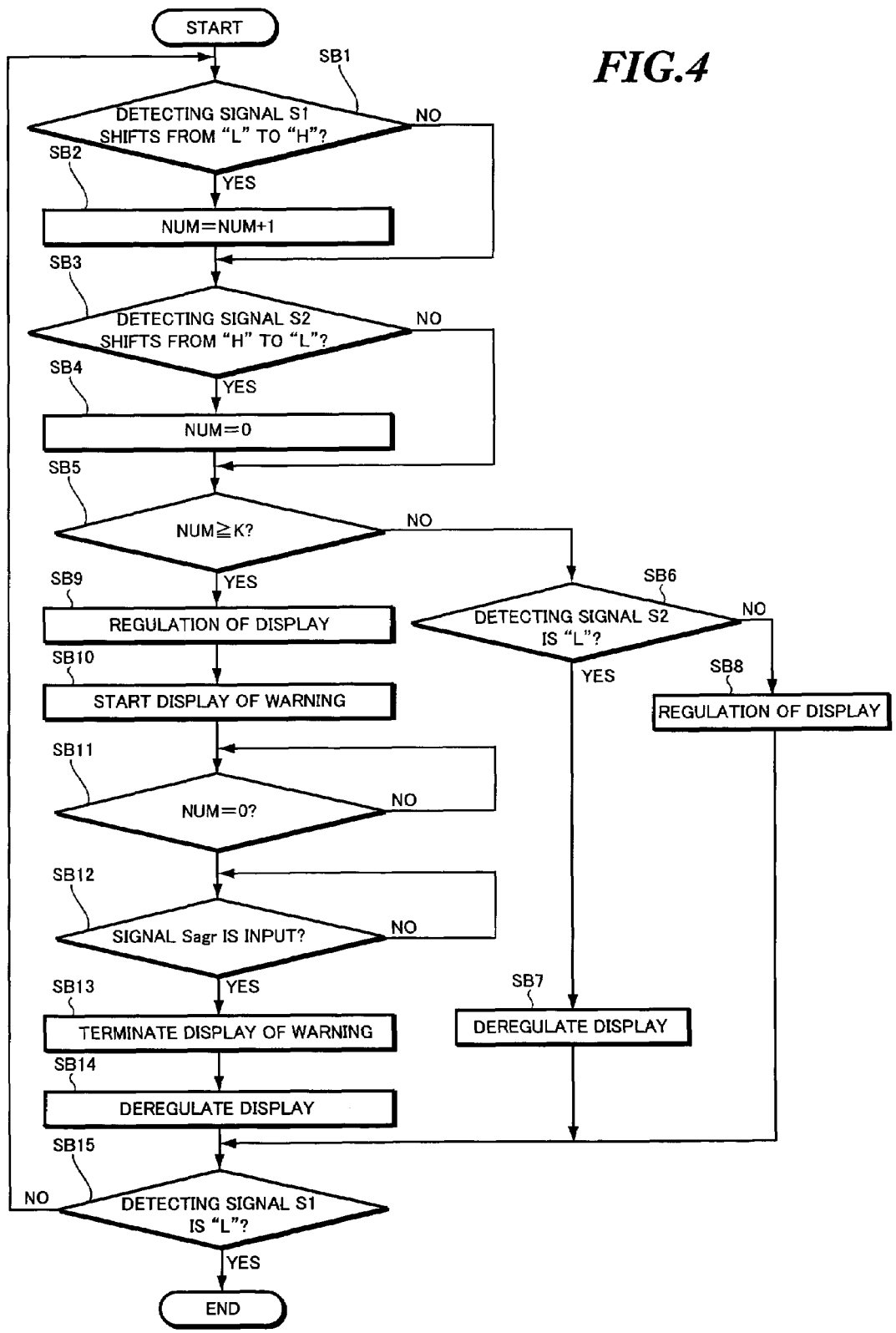
FIG. 4 is a flowchart for further explaining an operation of the vehicle-mounted equipment control apparatus as shown in FIG. 1A.

FIG. 3 and FIG. 4 are flow charts for explaining the operation of the vehicle-mounted equipment control apparatus according to the present embodiment.

Figure 5:
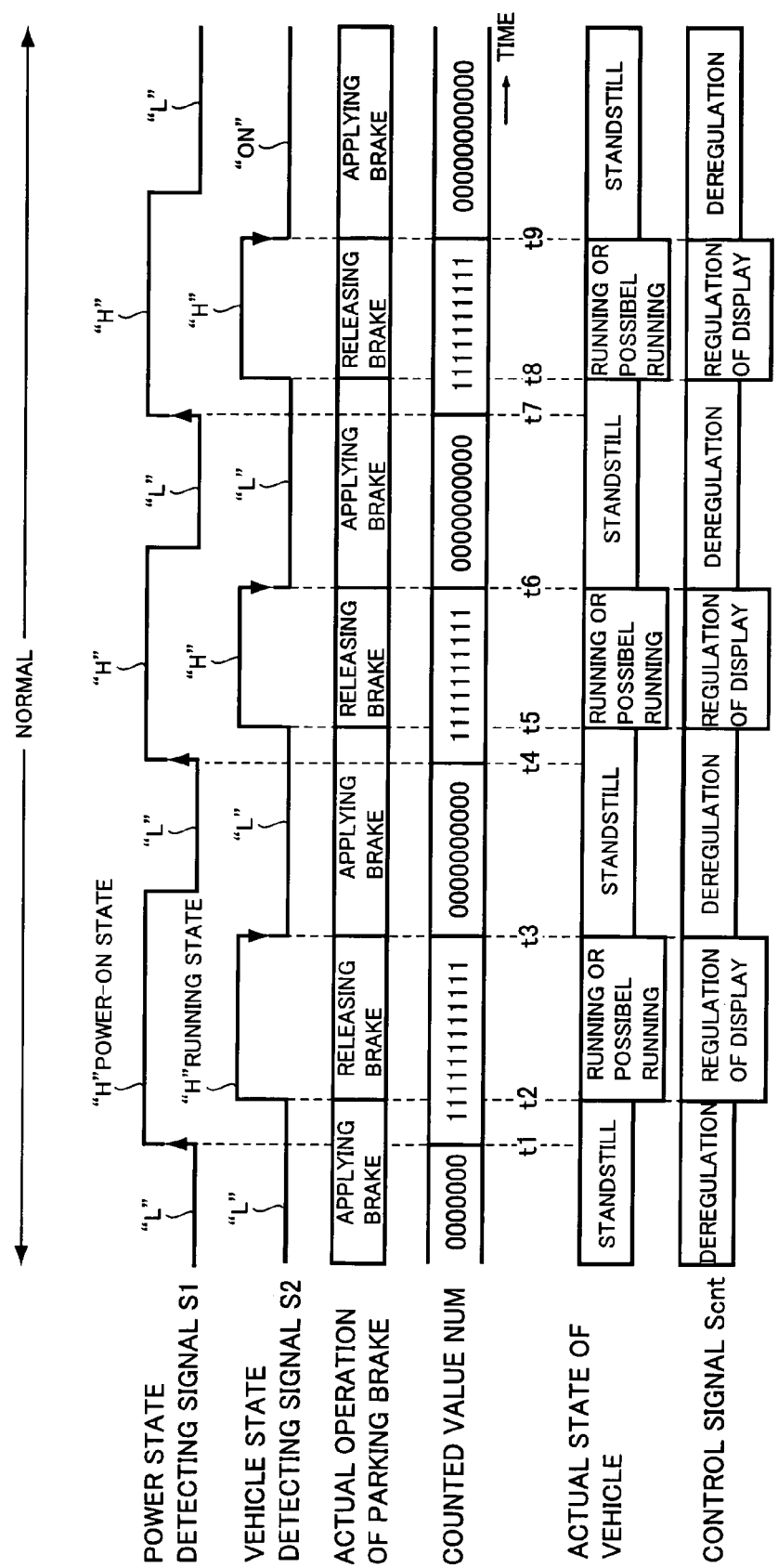
FIG. 5 is a timing chart for explaining an operation example of the vehicle-mounted equipment control apparatus as shown in FIG. 1A.
Figure 6:
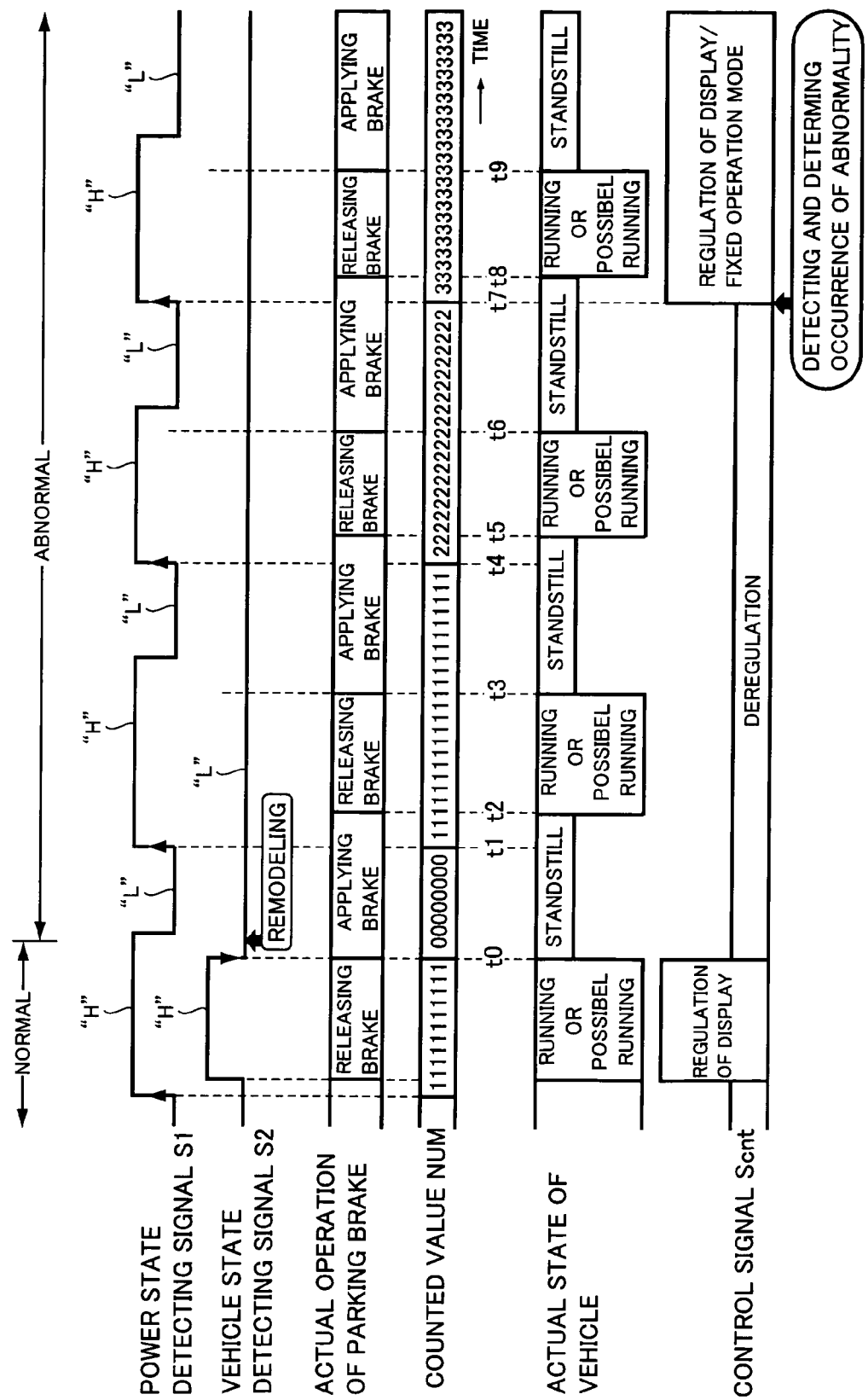
FIG. 6 is a timing chart for further explaining an operation example of the vehicle-mounted equipment control apparatus as shown in FIG. 1A.

FIG. 5 and FIG. 6 are timing charts for explaining the operation and the effect of the vehicle-mounted equipment control apparatus according to the present embodiment.

In FIG. 2, the vehicle-mounted equipment control apparatus 1 is provided with an edge-triggered type of resettable counter 2, a control circuit 3 formed with the microprocessor or the like, a chattering absorption circuit 4 and a chattering absorption circuit 5, each of which corresponds with the counter unit 2, the control unit 3, the power state detecting unit 4, and the vehicle state detecting unit 5 shown in FIG. 1A, respectively.

The chattering absorption circuit 4 is connected to the ACC switch 6 arranged in the vehicle through the detection line LN1, and detects the ON/OFF operation of the ACC switch 6 based on the ON/OFF signal Sa formed on the detection line LN1. The chattering absorption circuit 4 is provided with a low pass filter, which absorbs chattering noise in the ON/OFF signal Sa generated from the ACC switch 6 when the ON/OFF operation of the ACC switch is performed. As a result, the power state detecting signal S1 with chattering noise removed is generated and supplied to an input terminal, which is called a clock input terminal, of the resettable counter 2. The vehicle-mounted equipment 8 is provided power from the vehicle-mounted battery through the ACC switch 6. Thus, the power state detecting signal S1 showing the power-ON state and the power-OFF state of the vehicle-mounted equipment is supplied to the resettable counter 2.

The ACC switch 6 generally has a different constitution, depending on a vehicle. As the example is shown in FIG. 2, the OFF terminal, which is a terminal for cutting the accessory power, is connected to a ground terminal GND having the same electric potential as a vehicle body ground, and the ON terminal, which is a terminal for turning on the accessory power, is connected to a power source Vcc through Resistance R1.

If the user shifts the ACC switch 6 to the side of the ON terminal to turn on power, the chattering absorption circuit 4 outputs the power state detecting signal S1 showing the power-ON state, which is the logic "H" having almost the same electric pressure as the power source Vcc. If the user shifts the ACC switch 6 to the side of the OFF terminal to turn off power, the chattering absorption circuit 4 outputs the power state detecting signal S1 showing the power-OFF state, which is the logic "L" having almost the same electric potential as the ground terminal GND.

The chattering absorption circuit 5 is connected to a parking brake switch (PBK switch) 7 arranged in the parking brake (not shown) of the vehicle through the detection line LN2, and detects the ON/OFF operation of the parking brake based on the ON/OFF signal Sb formed on the detection line LN2. Furthermore, the chattering absorption circuit 5 is provided with a low pass filter for absorbing the chattering noise in the ON/OFF signal Spbk generated from the PBK switch 7 when the ON/OFF operation of the parking brake is performed. As a result, the vehicle state detecting signal S2 with chattering noise removed is generated and supplied to the reset input terminal of the resettable counter 2 and also the control circuit 3. Thereby, if the detection line LN2 is properly connected to the chattering absorption circuit 5, the circuit 5 supplies the vehicle state detecting signal S2 to the reset input terminal of the resettable counter 2 and also to the control circuit 3. The vehicle state detecting signal S2 shows that the vehicle is at a standstill by the power-ON operation of the parking brake, or that the vehicle is running by the power-OFF operation of the parking brake.

Here, as shown in FIG. 2, the PBK switch 7 is provided with the input terminal and the output terminal. The input terminal is connected to the ground terminal GND having the same electric potential as the vehicle body ground, and the output terminal, i.e., the ON terminal, is connected to the power source Vcc through Resistance R2. When the user performs the power-ON operation of the parking brake, i.e., the operation of applying the brake, the PBK switch 7 switches as if it closes between the input terminal and the ON terminal, thereby the chattering absorption circuit 5 outputs the vehicle state detecting signal S2 showing that the vehicle is at a standstill. The vehicle state detecting signal S2 is the logic "L" having almost the same electric potential as the ground terminal GND. When the user performs the power-OFF operation of the parking brake, i.e., the operation of releasing the brake, the PBK switch 7 switches as if it opens between the input terminal and the ON terminal, thereby the chattering absorption circuit 5 outputs the vehicle state detecting signals S2 showing that the vehicle is running. The vehicle state detecting signal S2 is the logic "H" having almost the same electric pressure as the power source Vcc.

The resettable counter 2 performs the counting operation in synchronization with the time when the power state detecting signal S1 shifts from the logic "L" to "H" in order to outputs the counted value NUM, which is counted up by one. The resettable counter 2 also performs the resetting operation in synchronization with the time when the vehicle state detecting signal S2 shifts from the logic "H" to "L", initializing the counter value NUM to "0".

The microprocessor as described above executes the prescribed program as described above, therefore the control circuit 3 performs the same process as the process explained with reference to FIG. 1B, that is, "Process 1", "Process 2", "Process 3", and "Process 4". Meanwhile, the threshold value K is set to be 3 according to the present embodiment.

The details will be described hereinafter, but the control circuit 3 initializes the vehicle-mounted equipment control apparatus 1 when newly electrically connected. When the control circuit 3 detects unusual situations, for example, the detection line LN2 is not appropriately wired or connected, the fixed operation mode is applied to the vehicle-mounted equipment by means of "Process 3" and "Process 4" as described above.

Furthermore, the control circuit 3 is provided with an image storage memory (not shown), in which an image data to display the prescribed still image on the display unit mounted on the vehicle-mounted equipment 8 is stored on beforehand for the warning, when the control circuit 3 performs the processing for the initialization and the fixed operation mode.

The operation of the vehicle-mounted equipment control apparatus 1 having the above-mentioned configuration will be explained with reference to the flowcharts in FIG. 3 and FIG. 4.

In FIG. 3, when the user mounts a newly-purchased vehicle-mounted electronic equipment 8 on the vehicle, and connects the vehicle-mounted equipment control apparatus 1 to the ACC switch 6 and the PBK switch 7 for the first time, the control circuit 3 starts processing for initialization of the equipment.

Firstly, flag data FLG showing that the control circuit 3 is in processing for the initialization of the equipment 8 is set inside at step SA1. Next, at step SA2, the control circuit 3 outputs the control signal Scnt indicating that the display should be regulated, and at the same time as that, the still image data stored on the image storage memory as described above is supplied to the vehicle-mounted electronic equipment 8 through a prescribed data transfer line connected beforehand thereto.

The still image is then displayed on the image display unit of the vehicle-mounted electronic equipment 8 for the warning, by using the above-mentioned image data, in which the control unit 3 notifies the user that the initialization is in process, requesting the user's agreement to that the remodeling of equipment wiring should not be performed.

For example, the image including phrases such as "The initialization is in processing. Please stop the car steadily for the sake of safety by pushing down the footbrake. Do you agree not to remodel your car?" is displayed on the equipment's display unit.

At step SA3, the control circuit 3 determines whether the prescribed input signal Sagr is supplied after the power-ON operation of the prescribed operation switch connected to the control circuit 3 beforehand. After the signal Sagr is detected, the control circuit 3 proceeds to step SA4. That is, the control circuit 3 stands by for agreement not to make any remodeling by the user and proceeds to step SA4 after the confirmation of the agreement is obtained based on the signal Sagr.

Next, at step SA4, the control circuit 3 detects the counted value NUM and stands by until the counted value NUM becomes "0". At that time, it is shown on the image display unit of the vehicle-mounted electronic equipment 8 that the user is requested to perform the operation for detecting a paring brake line. The display, for example, includes the phrases such as "The detection of the parking brake line will be conducted. While your car is at a standstill steadily by pushing down the foot brake, please perform the power-ON operation of the parking brake after the power-OFF operation is once performed."

In other words, if the user operates the parking brake as presented by the display, and no remodeling has been done, the level of the vehicle-state detecting signal S2 shifts from the logic "H" to "L" along with the power-ON operation of the parking brake after the power-OFF operation thereof. As the resettable counter 2 performs the resetting operation in synchronization with the time of shifting the logic, the counted value NUM becomes "0".

If the control circuit 3 detects the counted value NUM of the number "0", and determines that the PBK switch 7 and the vehicle-mounted equipment control apparatus 1 are connected through the detection line LN2 appropriately, then the process proceeds to step SA5.

At step SA5, the control circuit 3 outputs the control signal scnt indicating that the initialization has been completed to the vehicle-mounted electronic equipment 8, and terminates the display of the initialization as described above. Furthermore, the process of initializing is finished by resetting the flag data FLG, together with the completion of supplying the image data to the vehicle-mounted equipment 8. The process proceeds to the so-called "main routine" shown in FIG. 4 in order to perform "Process 1" "Process 2" "Process 3" and "Process 4" as described with reference to FIG. 1B.

In FIG. 4, the so-called main routine is described, and first the resettable counter 2 inputs the power state detecting signal S1 every receipt thereof. When the ACC switch 6 is turned power on, then the power state detecting signal S1 changes from the power-OFF state, i.e., the logic "L" to the power-ON state, i.e., the logic "H" at step SB1, the resettable counter 2 performs the counting operation in synchronization with the change of the logic as mentioned above, and outputs the counted value NUM which has been counted up by one, at step SB2.

Additionally, the resettable counter 2 inputs the vehicle state detecting signal S2 every receipt thereof. When the parking brake is applied, and the vehicle state detecting signal S2 changes from the state of running, i.e., the logic "H", to standstill, i.e., the logic "L" at step SB3, the resettable counter 2 performs the resetting operation in synchronization with the change of the logic as mentioned above, then outputs the counted value NUM of the number "0" at step SB4.

At step SB5, the control circuit 3 compares the counted value NUM and the threshold value K, which is the number "3" in this embodiment, and the process proceeds to step SB6 to detect the state of the vehicle state detecting signal S2 from the PBK switch 7 if the counted value NUM is less than the threshold value K.

If the vehicle state detecting signal S2 shows the state of vehicle's standstill, i.e., the logic "L", the control circuit 3 determines that the vehicle is "at a standstill", and the process proceeds to step SB7 to output the control signal Scnt indicating that the regulation of the display should be removed.

On the other hand, at step SB6, if the vehicle state detecting signal S2 shows the state of running, i.e., the logic "H", the control circuit 3 determines that the vehicle is "running" or "under the situation possible to run" because of a release of the parking brake, although the vehicle is not actually running. Therefore, the process proceeds to step SB8 where the control signal Scnt indicating the regulation of the display is output.

At step SB15, when the power state detecting signal S1 is turned power off, i.e., the logic "L", the control circuit 3 detects it to finish the process. When the ACC switch 6 is turned power on again and the vehicle-mounted equipment control apparatus 1 is started up, the control circuit 3 starts the process from step SB1 after confirmation of reset of the flag data FLG.

Meanwhile, if the power state detecting signal S1 is not turned power off, not being the logic "L" at step SB15, the control circuit 3 investigates the flag data FLG. Then, the processes from step SB1 are repeated to continue the processes of the main routine, if the flag data FLG is reset.

If the counted value NUM is greater than or equal to the threshold value K as a result of comparison between the counted value NUM and the threshold value K by the control circuit 3 at step SB5 as described above, the process proceeds to step SB9. At step SB9, the control signal Scnt indicating the regulation of the display is output when the control circuit 3 determines that the occurrence of any abnormality has been detected. Furthermore, at step SB10, the image data stored on the image storage memory is supplied to the vehicle-mounted equipment 8 through the prescribed data transfer line connected thereto beforehand.

At this stage, the fixed operation mode to continuously output the control signal Scnt indicating the regulation of the display is set. Furthermore, the still image for giving the above-mentioned warning is displayed by the image data on the image display unit of the vehicle-mounted electronic equipment 8, therefore notifying the user of the occurrence of abnormality.

Displayed is, for example, the warning including the phrases such as "An abnormality has arisen on wiring connections. After stopping your car steadily by pushing down the foot brake for the sake of safety, please confirm the wiring connections of the parking brake to be brought back to a normal state. When the wiring connections are returned to the normal state, please perform the power-ON operation of the parking brake after the power-OFF operation thereof is once performed while your car is surely at a standstill."

Next, at step SB11, the control circuit 3 detects the counted value NUM, and stands by until the counted value NUM becomes the number "0".

If the user operates the parking brake in accordance with the warning as described above to solve the abnormality, the vehicle state detecting signal S2 shifts from the state of running, i.e., the logic "H", to standstill, i.e., the logic "L" when the power-ON operation of the parking brake after the power-OFF operation thereof is once performed. The resettable counter 2 performs the resetting operation in synchronization with the time of the shift, therefore the counted value NUM becomes "0".

After detecting the counted value NUM of the number "0", the control circuit 3 determines that the PBK switch 7 and the vehicle-mounted equipment control apparatus 1 are appropriately connected through the detection line LN2, and then the process proceeds to step SB12.

The control circuit 3 makes the display such as "Do you agree not to remodel your car?", which urges the user to agree that no remodeling will be made, on the image display unit of the vehicle-mounted electronic equipment 8. The control circuit 3 determines whether the prescribed input signal Sagr including the agreement was supplied by the operation of the prescribed operation switch connected to the control circuit 3 beforehand. After detecting the signal Sagr, the process proceeds to step SB13.

In other words, the control circuit 3 stands by until agreement on no remodeling is obtained from the user, and the process proceeds to step SB13 after confirmation of the agreement was obtained based on the signal Sagr.

Next, at step SB13, the control circuit 3 outputs the control signal Scnt indicating removal of the abnormality to vehicle-mounted electronic equipment 8 and terminates the display of the warning. After the supply of the image data to the vehicle-mounted electronic equipment 8 is finished, the control signal Scnt indicating the deregulation of the display is output to remove the regulation of the display as well as the fixed operation mode at step SB14.

At step SB15, if the control circuit 3 detects that the power state detecting signal S1 shows the logic "L", the operation is subsequently terminated. When the ACC switch 6 is turned ON again and the vehicle-mounted equipment control apparatus 1 starts up, the control circuit 3 initiates the process from step SB1 after confirmation of the flag data FLG reset.

On the other hand, at step SB15, if the power state detecting signal S1 does not show the logic "L", the control circuit 3 investigates the flag data FLG. Then, the processes from step SB1 are repeated to continue the process of the main routine, if the flag data FLG is reset.

The operation example and the effect of the vehicle-mounted equipment control apparatus will be described hereinafter with reference to the FIGS. 5 and 6. FIG. 5 shows the operation example where the vehicle-mounted equipment control apparatus 1 and the PBK switch 7 are properly wired through the detection line LN2 without any remodeling, while FIG. 6 shows the example where the detection line LN2 is not properly wired because any remodeling has been done.

In FIG. 5, when the ACC switch is turned ON, i.e., the operation of turning on the accessory power, or turned off, i.e., the operation of cutting off the accessory power as the usual operation by the user, the power state detecting signal S1 then becomes either the power-ON state, i.e., the logic "H" or the power-OFF state, i.e., the logic "L".

When the user puts the parking brake into power-OFF operation, that is, the operation of applying the brake, thereby setting the state of "applying the brake", and the vehicle is "at a standstill", the vehicle state detecting signal S2 being output from the PBK switch 7 becomes the state of standstill, i.e., the logic "L".

When the user puts the parking brake into the Power-OFF operation, that is, the operation of releasing the brake is taken, and the vehicle is "running", the vehicle state detecting signal S2 becomes the state of running, i.e., the logic "H".

When the parking brake is put into the Power-OFF operation, but the vehicle is at a standstill by applying the foot brake, in the so-called "possible running state", the vehicle state detecting signal S2 is shown as the state of running, i.e., the logic "H".

In normal cases that no remodeling has been made, the level of the vehicle state detecting signal S2 shows either the logic "H" or "L" in conjunction with the ON/OFF operation of the parking brake.

When the user turns on the ACC switch 6 at the time of t1, t4, t7 in FIG. 5, the power state detecting signal S1 changes from the logic "L" to "H". The counting unit 2 performs the counting operation in synchronization with the time of the level change, t1, t4, t7 to output the counted value NUM which has counted up by one.

Also, when the user performs the Power-ON operation of the parking brake at the time of t3, t6, t9 in FIG. 5, the vehicle state detecting signal S2 changes from the logic "H" to "L". The counting unit 2 then performs the resetting operation in synchronization with the time of the level change, t3, t6, t9 to set the counted value NUM to "0".

In addition, while the level of the power state detecting signal S1 or the vehicle state detecting signal S2 does not change, the counting unit 2 holds the counted value NUM without change.

The control unit 3 compares the counted value NUM and the threshold value K, i.e., 3 in number, and detects the level of the vehicle state detecting signal S2 every receipt thereof. When the vehicle state detecting signal S2 shows the logic "H", the control signal Scnt indicating the regulation of the display is output. That is, when the vehicle state detecting signal S2 shows the logic "H", the vehicle is in the "running" state or the "possible running" state. Therefore, the control signal Scnt indicating the regulation of the display is output in order to ensure the safe driving.

Moreover, when the vehicle state detecting signal S2 shows the logic "L", the control unit 3 outputs the control signal Scnt indicating the deregulation of display after confirming that the counted value NUM is less than the threshold value K. More specifically, if the vehicle state detecting signal S2 shows the logic "L", the vehicle is at a standstill. Since, therefore, there is no problem for the safe driving even if any image is displayed, the regulation of display is removed.

More specifically, in the normal cases that no remodeling has been made, the counted value NUM does not become a value greater than or equal to the threshold value K, i.e., 3 in number. AS a result, the vehicle-mounted equipment control apparatus 1 regulates or deregulates the display in conjunction with the ON/OFF operation of the parking brake. Therefore, the control apparatus can perform the control in response to the actual situation of the vehicle, i.e., "running or possible running" state or "standstill" state.

Next, the operation in the case that any remodeling is performed will be explained with reference to FIG. 6.

If, for example, the user brings the brake to applied situation by performing the Power-ON operation of the parking brake, and then connects the detection line LN2 between the counting unit 2 and the PBK switch 7 to the vehicle body ground, the vehicle state detecting signal S2 is always placed under the standstill condition, i.e., the logic "L" irrespective to the actual ON/OFF operation of the parking brake. In such a way, the remodeling for driving the vehicle without regulation of display even if the vehicle is running is performed.

However, according to the present invention, if the user performs the Power-ON operation of the ACC switch 6 at the time of t1, t4, and t7 in FIG. 6 so as to drive the vehicle after the remodeling, the counting unit 2 performs only the counting operation without the resetting operation since the vehicle state detecting signal S2 always shows the logic "L" without change. Therefore, the counted value NUM becomes "3" at the time of t7.

The control unit 3 determines that any abnormality occurs when the counted value greater than or equal to "3" is detected, so that the image display is regulated, and then the process proceeds to the fixed operation mode as mentioned above.

Even if, therefore, a user performs the remodeling in order to make the vehicle state detecting signal S2 always show the logic "L" indicating the standstill state of vehicle in spite of the actual state of running, the counted value NUM reaches the threshold value K, i.e., 3 in number, sooner or later, when the user performs the Power-ON operation of ACC switch 6 in order to drive the vehicle. Therefore, since the control unit 3 detects this counted value NUM to cause the fixed operation mode as mentioned above, the user is urged to recover an adequate wiring so as to remove the fixed operation mode.

As mentioned above, the vehicle-mounted equipment control apparatus 1 of the present embodiment is provided with the counting unit 2 for performing the counting operation and the resetting operation only when each level of the power state detecting signal S1 being output from the ACC switch 6 and the vehicle state detecting signal S2 being output from the PBK switch 7 changes. When the counted value NUM of the counting unit 2 reaches the predetermined threshold value K, the occurrence of abnormality is determined by the control unit 3, so that any inadequate wiring caused by any remodeling or wrong wiring can be surely detected.

In other words, when the remodeling to always make the vehicle state detecting signal S2 show the standstill state is made, the counting unit 2 performs only the counting operation, namely, counts up one by one, based on the power state detecting signal S1 being output from the ACC switch 6. In short, there occurs no resetting operation, namely, the counted value does not become "0", since the vehicle state detecting signal S2 always remains the logic "L" after the remodeling as shown in FIG. 6. Thus, if the remodeling is made, the counted value NUM is sure to reach the threshold value K after some times of power ON, so that the abnormality based on the remodeling can be detected.

In addition, when it is determined that the counted value NUM reaches the predetermined threshold value K, the process proceeds to the fixed operation mode, in which the regulation of display is continuously made. Unless the user recovers the remodeled wiring to the adequate one, and further inputs the predetermined input signal Sarg to show the user's agreement to no-remodeling, the fixed operation mode can not be removed. In such a way, the control apparatus of the present invention can urge the user to appropriately use the vehicle-mounted equipment without remodeling.

According to the present invention, if the detection lines LN2 are adequately wired without remodeling, the user can easily remove the regulation of display to display any image only by performing the Power-ON operation of the parking brake during the standstill of vehicle. Thus, the vehicle-mounted equipment control apparatus with better operability than that of the conventional control apparatus can be provided.

Additionally, any special detection line need not be provided in the present invention. Consequently, the operability and the mounting of the vehicle-mounted equipment can be improved. Also, the vehicle-mounted equipment control apparatus can provided without waste of cost.

Moreover, the threshold value K being preset in the control unit 3 is set to "3", but may be "2".

If the threshold value K is set to "2", the occurrence of abnormality can be detected more rapidly, comparing with the case that the threshold value is "3". More specifically, the counted value NUM becomes "2" at the time t4 when the ACC switch 6 is turned ON two times so as to drive the vehicle, not the time t7. In a word, a so-called "detecting sensitivity" for detecting the occurrence of abnormality can be raised to rapidly proceed to the fixed operation mode if the threshold value K is set not to "3", but to "2".

However, it is preferable to determine the threshold value K to make the control apparatus be not provided with too high detecting sensitivity of abnormality, considering effect of noise caused inside or outside the vehicle or difference in configuration and function of the ACC switch every vehicle.

The threshold value K may be "4" or more. However, if set so, it should be noted that the detection of abnormality may be too late from a viewpoint of safety drive.

Also, it is desirable to set the threshold value K to a preferable value in accordance with the respective conditions of usage in the vehicle-mounted equipment control apparatuses according to the present embodiment. In other words, optimizing of the so-called interlock control can be realized by appropriately adjusting the threshold value K in accordance with the condition of usage, even if the configuration or the function of the ACC switch 6 and the PBK switch 7 is different, depending on each vehicle.

According to the vehicle-mounted equipment control apparatus 1 of the present embodiment, the image data storage memory is provided thereon, in which the image data for the respective displays of initialization and warning stored. However, the image data storage memory may be provided on the vehicle-mounted electronic equipment 8. More specifically, the control circuit 3 may instruct the vehicle-mounted electronic equipment 8 to perform the initialization display and the warning display based on the image data stored in the storage memory when the process proceeds to the initialization process or the fixed operation mode.

Furthermore, the vehicle-mounted equipment control apparatus 1 of the present embodiment may be arranged in the vehicle-mounted electronic equipment 8, or may be constituted separately from the vehicle-mounted electronic equipment 8.

While the vehicle-mounted equipment control apparatus 1 is constructed from so-called "hardware" in the descriptions according to the present embodiment above described, the functions of the counting unit 2, the control unit 3, the power state detecting unit 4 and the vehicle state detecting unit 5 may be put into practice by a computer program, then the computer program may be accomplished by a microprocessor.

Embodiment 2

Figure 7:
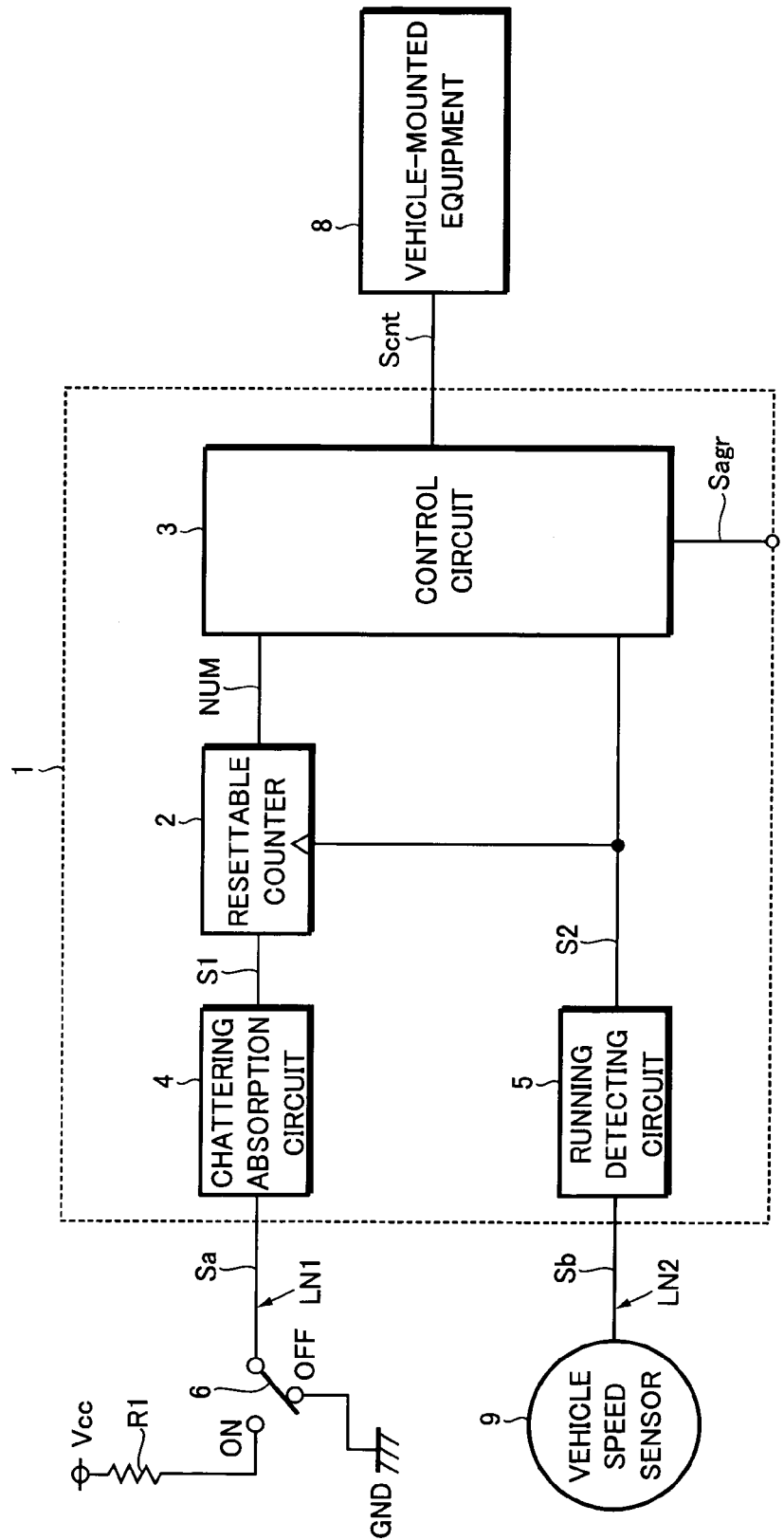
FIG. 7 is a block diagram showing a configuration of a vehicle-mounted equipment control apparatus according to the second embodiment of the present invention.

Next, the second embodiment will be more specifically explained with reference to FIG. 7, which is a block diagram showing a configuration of the vehicle-mounted equipment control apparatus.

Explaining the difference in the respective configurations of the vehicle-mounted equipment control apparatus 1 of the first and second embodiments, the control apparatus 1 of the present embodiment is provided with a running detecting circuit 5, in which vehicle speed pulse Sb being output from a vehicle speed sensor 9 mounted on a vehicle is input therein through the detection line LN2. The vehicle state detecting signals S2 being output from the running detecting circuit 5 is transmitted to a reset input terminal of the resettable counter 2 and to the control circuit 3.

More specifically, the vehicle-mounted equipment control apparatus according to the first embodiment as shown in FIG. 2 is provided with the chattering absorption circuit 5 connected to the parking brake switch 7, while the control apparatus of the present embodiment includes the running detecting circuit 5 instead of the chattering absorption circuit 5.

The running detecting circuit 5 is provided with a low pass filter for removing noise component included in the vehicle speed pulse Sb, in which pulse number per unit time (predetermined period) in the vehicle speed pulses passing through the low pass filter is counted. The counted value is compared with a threshold value for detecting speed. In other words, it is determined that the vehicle is at a standstill when the counted value is less than the threshold value, and also in the running state when greater than or equal to the threshold value, the result of which is output as the vehicle state detecting signal S2.

More specifically, the running detecting circuit 5 outputs the vehicle state detecting signal S2 with the logic "L" when the vehicle is running, while the vehicle state detecting signal S2 with the logic "H" be output when the vehicle is at a standstill.

The resettable counter 2, the control circuit 3 and the chattering absorption circuit 4 have the same configuration as those of the first embodiment as shown in FIG. 2. That is, the chattering absorption circuit 4 is connected to the ACC switch 6 through the detection line LN1, and the resettable counter 2 and the control circuit 3 perform the same operations as those of the vehicle-mounted equipment control apparatus of the first embodiment, as explained with reference to FIGS. 3 to 6, based on the power state detecting signal S1 and the vehicle state detecting signal S2.

According to the vehicle-mounted equipment control apparatus 1 having such a configuration, the counting unit 2 results in outputting the counted value NUM which will surely reach the threshold value K when any remodeling is made so as to always make the vehicle state detecting signal S2 show the standstill state. That is, in such a case, the resetting operation is not performed since the vehicle state detecting signal S2 shows that the vehicle is always in the standstill state, and so the counted value surely reaches the threshold value K. Thus, the control unit 3 determines that the abnormality occurs through detecting the counted value NUM which reaches the threshold value K, so that the inadequate wiring can be surely detected.

That is, when the remodeling for always making the vehicle state detecting signal S2 be the standstill state is made, the counting unit 2 performs no resetting operation, and counts up one by one based on the power state detecting signal S1 fed from the ACC switch 6, so that the counted value NUM surely reaches the threshold value K. The control unit 3 detects the counted value NUM which reached the threshold value K, and then determines that any abnormality occurs. As a result, any inadequate wiring or wrong wiring can be detected without failure.

In addition, as well as the first embodiment, when the control unit 3 determines that the counted value NUM reached the predetermined threshold value K, the process proceeds to the fixed operation mode, in which the regulation of display is continuously made. Unless the user recovers the remodeled wiring to the adequate one, and further inputs the predetermined input signal Sarg to show the user's agreement to no-remodeling, the fixed operation mode can not be removed. In such a way, the control apparatus of the present invention can urge the user to appropriately use the vehicle-mounted equipment without remodeling.

According to the present embodiment, the vehicle state detecting signal S2 for indicating the running or standstill state of vehicle is produced through using the vehicle speed pulse Sb being output from the vehicle speed sensor 9. Therefore, if the detection lines LN2 are adequately wired without remodeling, the user can easily remove the regulation of display to display any image by only stopping the vehicle. Thus, the vehicle-mounted equipment control apparatus with better operability than that of the conventional control apparatus can be provided.

Additionally, any special detection line need not be provided in the present embodiment also. Consequently, the operability and the mounting of the vehicle-mounted equipment can be improved. Also, the vehicle-mounted equipment control apparatus can provided without waste of cost.

Moreover, in the vehicle-mounted equipment control apparatus 1 of the present embodiment, the running or standstill state of vehicle is detected with the usage of the vehicle speed pulse Sb only being output from the vehicle speed sensor 9 to produce the vehicle state detecting signal S2. The interlock control, however, may be performed with the usage of the ON/OFF signal Sb also being output from the PBK switch 7 as shown in FIG. 2.

As shown in, for example, FIG. 8A, the control apparatus 1 may be provided with the two vehicle state detecting units of the chattering absorption circuit 5a and the running detecting circuit 5b. That is, the chattering absorption circuit 5a is connected to the PBK switch 7 through a detection line LN2a, while the running detecting circuit 5b is connected to the vehicle speed sensor 9 through a detection line LN2b. A vehicle state detecting signal S2a being output from the chattering absorption circuit 5a and a vehicle state detecting signal S2b being output from the running state detecting circuit 5b are fed to an OR circuit 10 as a logical operation circuit. In such a way, the vehicle state detecting signal S2 as output from the OR circuit 10 is supplied to the reset input terminal of the resettable counter 2 and also to the control unit 3.

According to the vehicle-mounted equipment control apparatus 1 having such a configuration, even if either one of detection lines LN2a and LN2b as connected to the PBK switch 7 and the vehicle speed sensor 9, respectively, is connected to the vehicle body ground by the remodeling, the vehicle state detecting signal S2 duly indicating the running or standstill state of vehicle can be produced in the OR circuit 10 based on signal fed from another detection line, i.e., without the remodeling. In other words, even if either one of detection lines is remodeled, the adequate regulation of image display or operation thereof can be caused without special action on an assumption that another detection line is adequately connected.

Furthermore, as shown in FIG. 8B, an AND circuit 11 may be provided instead of the OR circuit 10. That is, a vehicle state detecting signal S2a being output from the chattering absorption circuit 5a and a vehicle state detecting signal S2b being output from the running state detecting circuit 5b are fed to the AND circuit 11. Then, the vehicle state detecting signal S2 as output from the AND circuit 11 may be supplied to the reset input terminal of the resettable counter 2 and also to the control unit 3.

According to the vehicle-mounted equipment control apparatus 1 having such a configuration, the AND circuit 11 outputs the vehicle state detecting signal S2 which shows the existence of remodeling in the case that either one of the chattering absorption circuit 5a and the running state detecting circuit 5b is connected under the remodeling. Thus, the warning is sure to be given if either one of detection lines is remodeled, so that the remodeling will result in not being done easily according to the control apparatus with the AND circuit.

In the above mentioned first and second embodiments, the interlock control is performed by using the physical information of the output of PBK switch 7 and vehicle speed pulse being output from the vehicle speed sensor 9. The other physical information with which the running or standstill state of vehicle can be detected may be utilized.

For example, a GPS receiver for receiving a radio wave from a GPS satellite may be provided. The running or standstill state of vehicle is detected from a received signal thereof to produce the vehicle state detecting signal, which is supplied to the reset terminal of the resettable counter 2 and also to the control unit 3.

The vehicle state detecting signal produced from the signal received by the GPS receiver may be input to the OR circuit 10 as shown in FIG. 8A as well as the vehicle state detecting signals S2a and S2b. The vehicle state detecting signal S2 being output from the OR circuit 10 results in being supplied to the reset input terminal of the resettable counter 2 and also to the control unit 3.

Further, the vehicle state detecting signal produced from the signal received by the GPS receiver may be input to the AND circuit 11 as shown in FIG. 8B as well as the vehicle state detecting signals S2a and S2b. The vehicle state detecting signal S2 being output from the AND circuit 11 results in being supplied to the reset input terminal of the resettable counter 2 and also to the control unit 3.

According to the present embodiment above described, while the vehicle-mounted equipment control apparatus 1 is constructed from so-called "hardware" in the descriptions, the functions of the resettable counter, the control circuit, the chattering absorption circuit, and the vehicle state detecting circuit may be put into practice by a computer program, then the computer program may be accomplished by a microprocessor.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A vehicle-mounted equipment control system for regulating an image display or an operation by a vehicle-mounted equipment during vehicle's running, comprising:
   power state detecting means for detecting whether a power of the vehicle-mounted equipment is ON or OFF;
   vehicle state detecting means for detecting whether a vehicle is running or at a standstill;
   counting means for performing a counting operation when the power state detecting means detects a change of power from OFF to ON, and for performing a resetting operation when the vehicle state detecting means detects a change of vehicle state from a running state to standstill state; and
   control means for regulating or deregulating an image display or an operation of the vehicle-mounted equipment based on a detected result of the vehicle state detecting means and a counted or reset value of the counting means.

2. The vehicle-mounted equipment control system according to claim 1, wherein
   the power state detecting means detects an ON state of an accessory power switch for determining that a power of the vehicle-mounted equipment is under an ON state, and detects an OFF state of the accessory power switch for determining that the power of the vehicle-mounted equipment is under the OFF state.

3. The vehicle-mounted equipment control system according to claim 1, wherein
   the vehicle state detecting means detects an OFF state of a parking brake switch for determining that a vehicle is running, and detects an ON state of the parking brake switch for determining that a vehicle is at a standstill.

4. The vehicle-mounted equipment control system according to claim 1 wherein
   the vehicle state detecting means detects whether the vehicle is running or at a standstill based on a vehicle speed detecting signal being output from a vehicle speed sensor.

5. The vehicle-mounted equipment control system according to claim 1, wherein
   the control means regulates the image display or the operation of the vehicle-mounted equipment when the counted value of the counting means is smaller than a predetermined value and also when the vehicle state detecting means detects that the vehicle is running.

6. The vehicle-mounted equipment control system according to claim 1, wherein
   the control means removes a regulation to the image display or the operation of the vehicle-mounted equipment when the counted value of the counting means is smaller than a predetermined value and also when the vehicle state detecting means detects that the vehicle is at a standstill.

7. The vehicle-mounted equipment control system according to claim 1, wherein
   the control means regulates the image display or the operation of the vehicle-mounted equipment when the counted value of the counting means is greater than or equal to a predetermined value irrespective of a result detected by the vehicle state detecting means.

8. The vehicle-mounted equipment control system according to claim 7, wherein
   the control means gives a user a warning that the vehicle-mounted equipment is not adequately connected, in addition to regulating the image display or the operation of the vehicle-mounted equipment.

9. The vehicle-mounted equipment control system according to claim 8, further comprising:
   inputting means for the user to make a predetermined input against the warning,
   wherein the counting means performs the resetting operation when the inputting means makes the predetermined input, so that the control means terminates the warning.

10. The vehicle-mounted equipment control system according to claim 3, wherein:
    the vehicle state detecting means includes other detecting means for detecting whether the vehicle is running or at a standstill based on physical information different from physical information of the parking brake switch; and
    the control means controls the image display or the operation of the vehicle-mounted equipment based on the detection result of the vehicle state detecting means and the other detecting means, and the counted value of the counting means.

11. The vehicle-mounted equipment control system according to claim 4, wherein:
    the vehicle state detecting means includes other detecting means for detecting whether the vehicle is running or at a standstill based on physical information different from physical information of the vehicle speed sensor; and
    the control means controls the image display or the operation of the vehicle-mounted equipment based on the detection result of the vehicle state detecting means and the other detecting means, and the counted value of the counting means.

12. A vehicle-mounted equipment control method for regulating an image display or an operation by a vehicle-mounted equipment during vehicle's running, comprising the steps of:
   detecting a power state to detect whether a power of the vehicle-mounted equipment is ON or OFF;
   detecting a vehicle state to detect whether a vehicle is running or at a standstill;
   performing a counting operation when the power state detecting step detects a change of power from OFF to ON, and also a resetting operation when the vehicle state detecting step detects a change of vehicle state from a running state to standstill state; and
   controlling a regulation or a deregulation of image display or operation of the vehicle-mounted equipment based on a detected result of the vehicle state detecting step and a counted or reset value of the counting step.

13. A computer-readable recording medium for enabling a computer to regulate an image display or an operation by a vehicle-mounted equipment during vehicle's running, comprising the steps of:
   detecting a power state for enabling the computer to detect whether a power of the vehicle-mounted equipment is ON or OFF;
   detecting a vehicle state for enabling the computer to detect whether a vehicle is running or at a standstill;
   performing a counting operation when the power state detecting step detects a change of power from OFF to ON, and also a resetting operation when the vehicle state detecting step detects a change of vehicle state from a running state to standstill state; and
   controlling a regulation or a deregulation of image display or operation of the vehicle-mounted equipment based on a detected result of the vehicle state detecting step and a counted or reset value of the counting step.

* * * * *